US008155339B2

(12) United States Patent
Conrad

(10) Patent No.: US 8,155,339 B2

(45) Date of Patent: Apr. 10, 2012

(54) AIR-DROPPABLE LOUDSPEAKER

(75) Inventor: Terry J. Conrad, Poulsbo, WA (US)

(73) Assignee: Conquest Innovations LLC, Poulsbo, WA (US)

( * ) Notice: Subject to any disclaimer, the term of this patent is extended or adjusted under 35 U.S.C. 154(b) by 1872 days.

(21) Appl. No.: 11/317,103

(22) Filed: Dec. 22, 2005

(65) Prior Publication Data

US 2006/0198534 A1 Sep. 7, 2006

Related U.S. Application Data

(60) Provisional application No. 60/640,334, filed on Dec. 29, 2004.

(51) Int. Cl.

*H04R 27/04* (2006.01)
*H04R 27/00* (2006.01)
*H04R 1/20* (2006.01)
*H04B 3/00* (2006.01)

(52) U.S. Cl. ............... 381/75; 381/77; 381/82; 381/340

(58) Field of Classification Search .................... 381/75, 381/77, 340, 82
See application file for complete search history.

(56) References Cited

U.S. PATENT DOCUMENTS 2,830,116 A * 4/1958 Hardesty ......................... 381/75
4,093,935 A 6/1978 Ouellette
6,466,680 B1 * 10/2002 Gelow et al. .................. 381/340

* cited by examiner

*Primary Examiner* — Devona Faulk
(74) *Attorney, Agent, or Firm* — Lowe Graham Jones PLLC

(57) ABSTRACT

A loudspeaker has a horn adapted to both cause air drag and to direct acoustic waves. A speaker and signal generator are electrically coupled to the speaker and secure to the horn. The loudspeaker is transported over a target and dropped from a high elevation. Upon landing the loudspeaker commences broadcasting a message. A shock absorber may secure to the horn and absorbs some of the shock of impact. Contact sensors or motions sensors may trigger broadcasting a message from the speaker. A portion of the horn may be expandable to increase the size of the horn upon deployment or upon impact with the ground.

12 Claims, 9 Drawing Sheets

AIR-DROPPABLE LOUDSPEAKER

PRIORITY CLAIM

This application claims the benefit of U.S. Provisional Application Ser. No. 60/640,334 filed Dec. 29, 2004 and entitled AIR-DROPPABLE LOUDSPEAKER.

FIELD OF THE INVENTION

This invention relates generally to sound producing systems and more particularly to megaphones for local sound broadcasting.

BACKGROUND OF THE INVENTION

In many situations it is critical to deliver information to a large number of people other than by traditional mass media channels such as television and radio. For example, large scale disasters such as hurricanes and earthquakes often cut off electricity. In such situations it is often necessary to tell people where to go for food, shelter, and safety. It may also be necessary to warn people of an impending threat.

In armed conflicts, it is often advantageous to engage in psychological warfare in order to dishearten enemy combatants or to undermine popular support for military action. However, in armed conflicts, transmitting equipment for communication over radio and television may be unavailable and time consuming to provide. Furthermore, the intended audience may not have access to receiving devices or be aware of attempts to broadcast information.

Leaflets are a common method for delivering information on a large scale in such situations. However, in order to reach large amounts of people, large numbers of leaflets must be dropped. Furthermore, in many parts of the world, people are not literate. Leaflets also require extensive printing and packaging in order to transmit a given message to the people.

High-wattage electrical sound systems with independent power supplies may be effective to widely transmit information in some situations. However, in armed conflicts, it is difficult to safely position a sound system where it will be most effective. In any case, sound systems large enough to reach large numbers of people are typically large and it may be difficult to transport such a sound system to a given location.

In view of the foregoing, it would be an advancement in the art to provide a system for broadcasting information to large numbers of people in inaccessible or hostile environments, without regards to literacy or the availability of electrically powered receiving devices such as radio or television.

SUMMARY OF THE INVENTION

The present invention comprises a system and method for broadcasting information. In one embodiment a loudspeaker has a horn adapted to cause air drag and to direct acoustic waves. A speaker and signal generator electrically coupled to the speaker secure to the horn. The loudspeaker is transported over a target and dropped from a high elevation, such as an elevation typically navigated by aircraft. The loudspeaker is then released and allowed to fall to the ground. A fin may secure to the horn and cause spinning of the horn in order to increase air drag. A shock absorber may also secure to the horn and absorbs some of the shock of impact.

In one embodiment, a sensor is coupled to the signal generator and induces the signal generator to produce sound at the speaker upon detection of contact of the loudspeaker with the ground. Sensing contact of the loudspeaker with the ground may include sensing tipping or deceleration of the loudspeaker. In still other embodiments, a motion sensor is electrically coupled to the signal generator and induces the signal generator to broadcast the message upon detecting movement near the loudspeaker.

In yet another embodiment, the horn comprises a retractable portion having a deployed position wherein the retractable portion is positioned to direct acoustic waves from the speaker and a stowed position wherein the retractable position causes less air drag than in the deployed position. A latching mechanism releases the retractable portion upon impact of the loudspeaker with the ground. A biasing member then urges the retractable portion into the deployed position.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
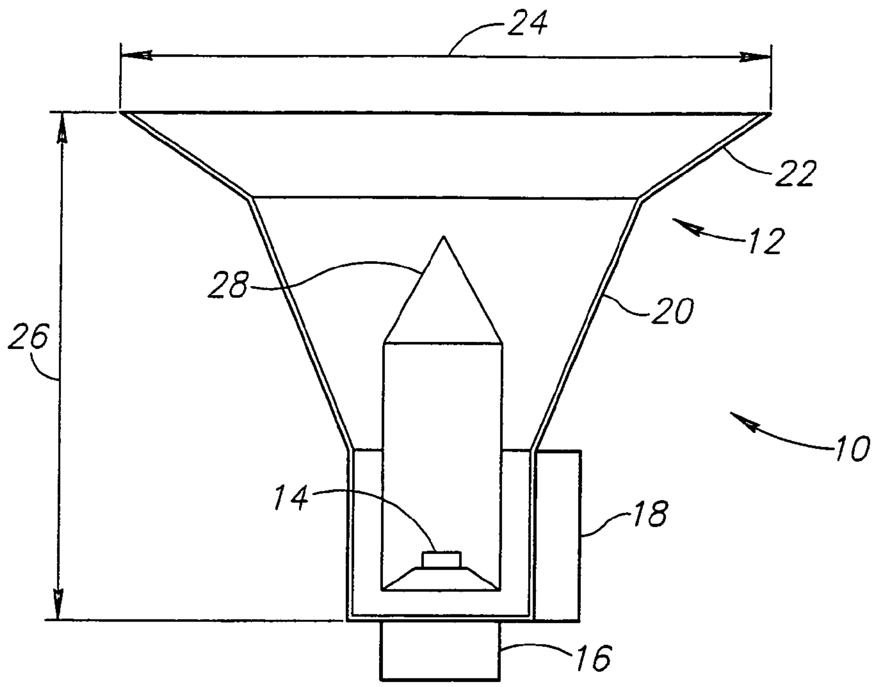
FIG. 1 is a side view of an air-droppable loudspeaker, in accordance with an embodiment of the present invention.

Referring to FIG. 1, an apparatus 10 includes a horn 12, or megaphone 12, a speaker 14, a cushioning portion 16, and a signal generator 18. The horn 12 is adapted to project sound and includes a conical portion 20 facilitating this function. The horn 12 is typically formed of filled or unfilled polymers, wood such as balsa, molded or sheet paper, and the like. Materials used to form the horn 12 may be biodegradable to reduce the environmental impact of the apparatus 10. Materials used may be buoyant such that the apparatus 10 floats if dropped in water.

A flared portion 22 may secure to the conical portion to further facilitate sound projection. The flared portion 22 may also be adapted to increase wind drag on the apparatus 10 when falling through the air such that a parachute need not be secured to the apparatus 10. In some embodiments, the flared portion 22 has a greatest diameter 24 that is greater than or equal to the height 26 of the horn 12 or apparatus 10. Various sizes for the horn 12 are possible such as about 3 inches by 2.5 inches up to about 10 inches by 6 inches.

In the illustrated embodiment, the flared portion 22 is a section of a cone having a slope smaller than that of the conical portion 20. In other embodiments, the flared portion, or combined conical portion 20 and flared portion 22, is shaped as a revolution of an exponential curve. The signal generator 18 secures to the horn 12, typically on the conical portion 20 and provides an electrical signal to drive the speaker 14.

The signal generator 18 is electrically connected to the speaker 14 and provides an electrical signal to drive the speaker 14. A shield 28 may be positioned over the speaker 14 to protect the speaker from weathering and impact. The shield 28 may be shaped to further provide improved acoustic phase summation and impedance transformation as compared to a planar cover. The shield 28 may be shaped to cause the expansion rate of the horn 12 to better approximate an exponential expansion rate. The cushioning portion 16 secures to the horn 12 and absorbs some of the force of impact of the apparatus 10 with the ground to reduce the risk of damage to the speaker 14 and signal generator 18. The cushioning portion 16 may further reduce injury to people, animals, or structures impacted by the falling apparatus 10. The cushioning portion 16 is typically formed of a resilient material, such as rubber, or other polymer having like properties. The cushioning portions secures to the narrower end of the conical portion 20 opposite the flared portion 22. Alternatively, the cushioning portion may secure at another point on the horn 12 that is likely to impact the ground first.

Figure 2:
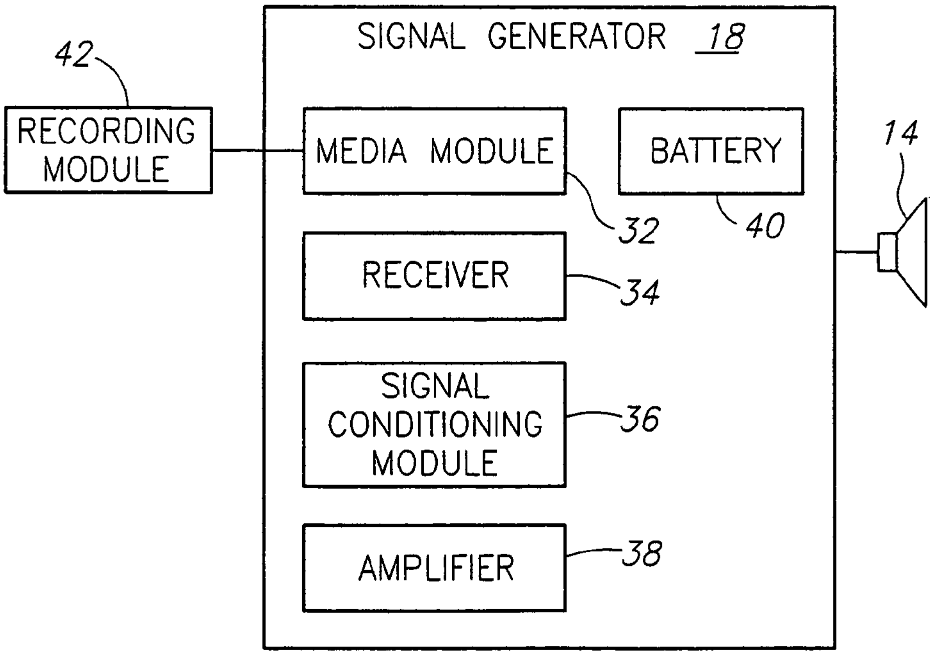
FIG. 2 is a schematic block diagram of a signal generator suitable for use with the air-droppable loudspeaker of FIG. 1, in accordance with an embodiment of the present invention.

Referring to FIG. 2, the signal generator 18 may include a media module 32, a receiver 34, a signal conditioning module 36, an amplifier 38, and a battery 40. The media module 32 may store a recorded message and play back the message. In some methods for using the apparatus 10, multiple apparatus 10 are deployed over a region. The multiple apparatus 10 may play the same message, different messages, or one of two or more messages. In embodiments using multiple messages, the different messages may be in different languages and apparatus 10 playing the same message may be deployed proximate one another. In some embodiments, a message is transmitted to the apparatus 10 by means of a receiver 34 tuned to a particular frequency or tunable by a finder of the apparatus 10. In method of using the apparatus 10 using multiple apparatus 10, the receivers 34 of the multiple apparatus 10 may be tuned to different frequencies or otherwise adapted to receive different messages.

Some embodiments of the apparatus 10 include only one of the media module 32 and the receiver 34 in order to generate messages for broadcast. Embodiments having media modules 32 may receive recorded messages by means of recorded media placed within the apparatus 10. Alternatively, the media module 32 may have internal memory which is written to by a recording module 42 selectively placed in data or electrical communication with the media module prior to deployment of the apparatus 10. Embodiments having a receiver 34 receive a transmitted message and translate the message into signals suitable for input to the speaker 14.

The signal conditioning module 36 may receive the message signal from the media module 32 or the receiver 34 and filter or otherwise condition the signal prior to broadcast of the message on the speaker 14. The amplifier 38 increases the amplitude of the message and provides an amplified message signal to the speaker 14.

Figure 3:
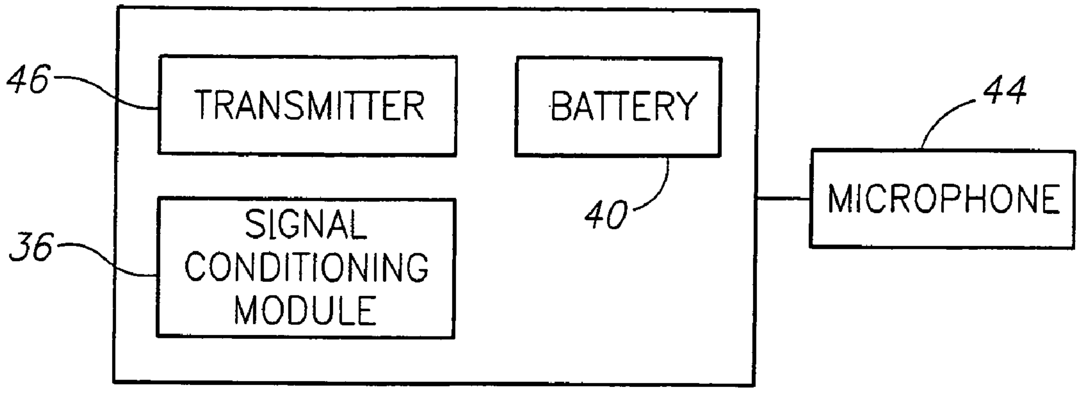
FIG. 3 is a schematic block diagram of a signal generator incorporating a microphone, in accordance with an embodiment of the present invention.

Referring to FIG. 3, in some embodiments, the apparatus 10 is used for surveillance instead of or in addition to broadcasting. In such embodiments, the apparatus 10 includes a microphone 44 positioned within or connected to the horn 12 and a transmitter 46 for receiving signals from the microphone 44 and transmitting them to a listener.

Figure 4:
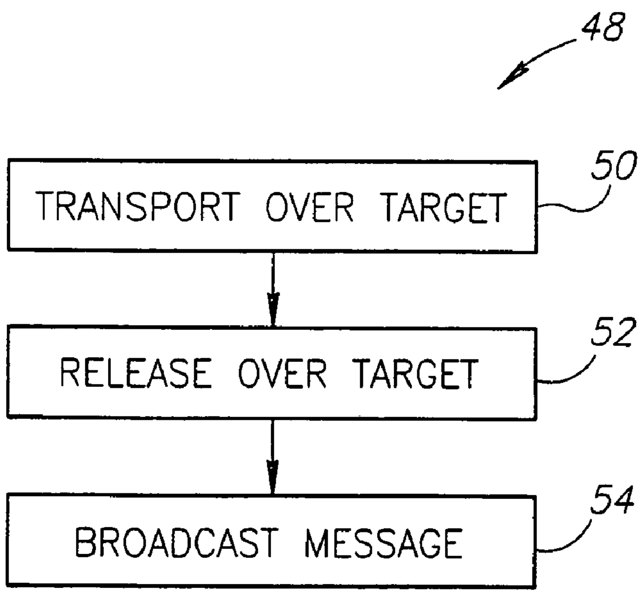
FIG. 4 is a process flow diagram of a method for deploying an air-droppable loudspeaker, in accordance with an embodiment of the present invention.

Referring to FIG. 4, a method 48 for using the apparatus 10 may include transporting 50 the apparatus 10 to a higher elevation over a target. Transporting 50 the apparatus 10 over the target typically includes carrying the apparatus 10 to a height navigable by aircraft. In some embodiments, the height is such that the apparatus 10 will have reached its terminal velocity prior to impacting the ground. The apparatus 10 is then released 52 over a target. The apparatus 10 then begins to broadcast 54 the message through the speaker. Alternatively, the apparatus 10 may be switched on such that it begins to broadcast 54 the message prior to release 52 or transport 50. In an alternative embodiment, transporting 50 the apparatus 10 over the target includes launching the apparatus 10 over the target, such as by throwing or other means. In such embodiments, the step of releasing 52 the apparatus 10 may be omitted 14. In embodiments having a microphone 44, the broadcasting step 54 may be replaced by the step of detecting sound by means of the microphone 44.

Figure 5:
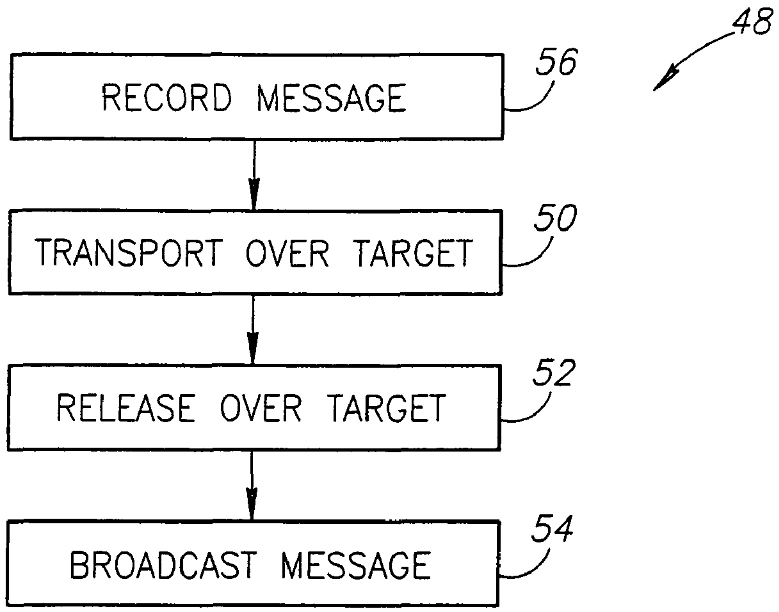
FIG. 5 is a process flow diagram illustrating another method for deploying an air-droppable loudspeaker, in accordance with an embodiment of the present invention.
Figure 6:
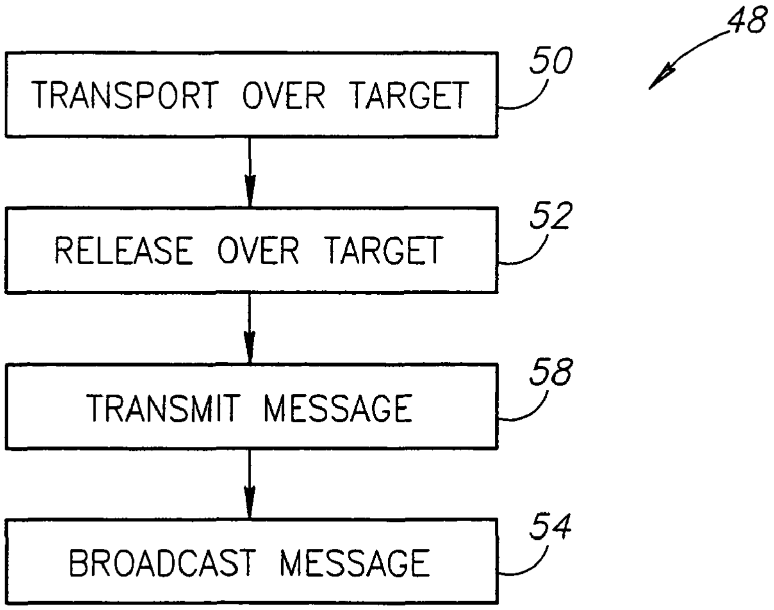
FIG. 6 is a process flow diagram of another method for deploying an air-droppable loudspeaker, in accordance with an embodiment of the present invention.

Referring to FIG. 5, in embodiments having a media module 32, the method 48 may further include the step of recording 56 the message to be played back during the broadcasting step 54. Referring to FIG. 6, in embodiments having a receiver 34, the method 44 may further include transmitting 58 the message to the receiver 34. The receiver 34 receives the transmitted message and translates the message to electrical signals input to the speaker 14.

Figure 7:
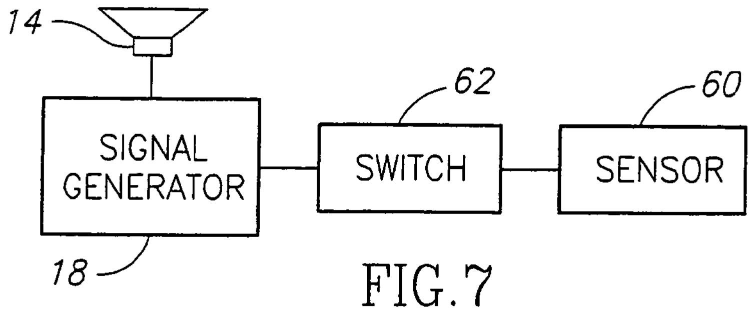
FIG. 7 is a schematic block diagram of a signal generator activated by a contact sensor, in accordance with an embodiment of the present invention.
Figure 8:
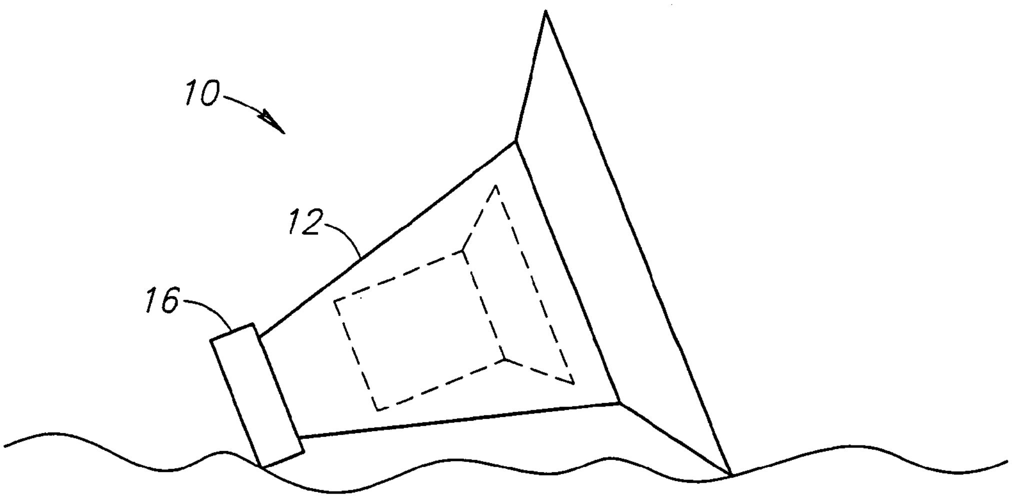
FIG. 8 is a side view of a deployed air-droppable loudspeaker, in accordance with an embodiment of the present invention.
Figure 9:
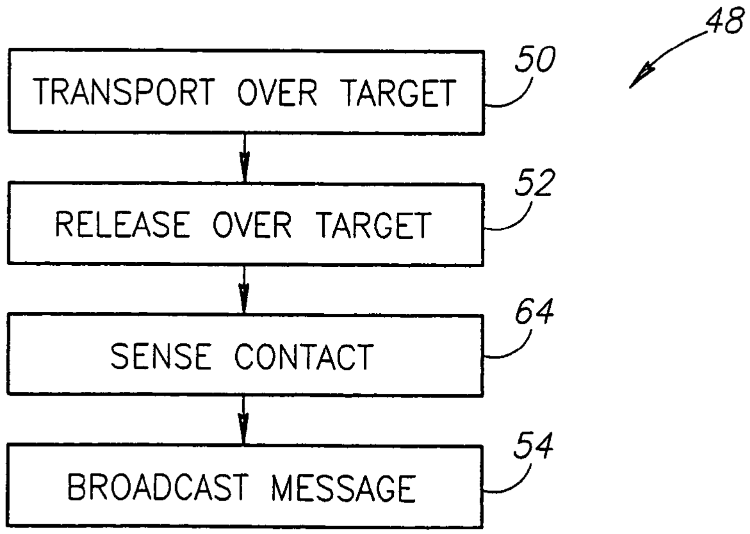
FIG. 9 is a process flow diagram of a method for using the signal generator of FIG. 7.

Referring to FIG. 7, in some embodiments, a contact sensor 60 provides an input to a switch 62 coupled to the signal generator 18 to control broadcasting of messages through the speaker 14. The contact sensor 60 senses impact of the apparatus 10 with the ground. Referring to FIG. 8, in some embodiments, the sensor 60 senses tipping of the apparatus 10 such that when the apparatus 10 lands and falls laterally, as illustrated, the apparatus 10 is activated and begins to broadcast the message. In alternative embodiments, the sensor 56 indicates to the switch 62 that impact has occurred upon sensing an impact or large deceleration. Referring to FIG. 9, apparatus 10 having a sensor 60 and switch 62 may include the additional step of sensing 64 contact of the apparatus 10 with the ground prior to broadcasting 54 the message. In embodiments having a microphone 44, the broadcasting step 54 may be replaced by the step of detecting sound by means of the microphone 44 upon sensing 64 contact of the device with the ground.

Figure 10:
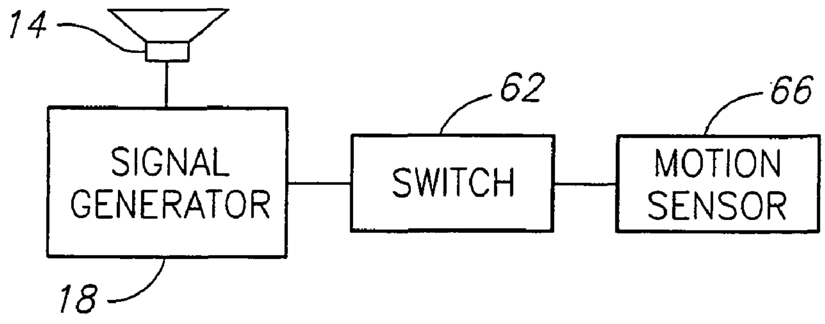
FIG. 10 is a schematic block diagram of signal generator activated by a motion sensor, in accordance with an embodiment of the present invention.
Figure 11:
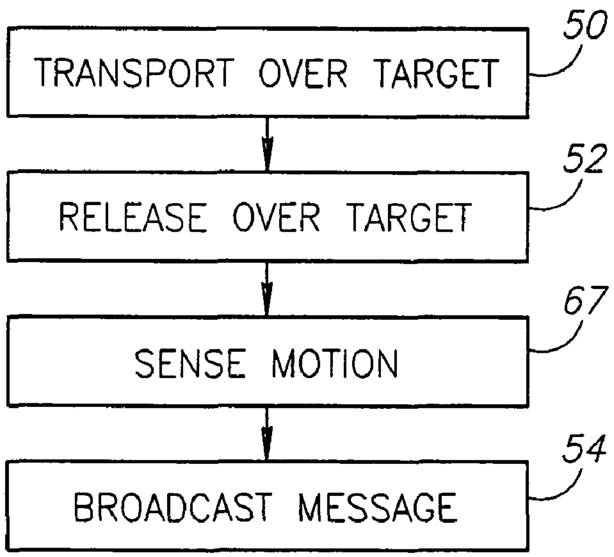
FIG. 11 is process flow diagram of a method for using the signal generator of FIG. 10, in accordance with an embodiment of the present invention.

Referring to FIG. 10, in some embodiments, a motion sensor 66 is coupled to the switch 62 such that movement around the apparatus 10 is sensed. Referring to FIG. 11, in such embodiments, the method 44 may include sensing 67 motion around the apparatus 10 prior to broadcasting 54 the message. The method 48 may also include both sensing 64 contact with the ground and sensing 67 motion around the apparatus 10. In embodiments having a microphone 44, the broadcasting step 54 may be replaced by the step of detecting sound by means of the microphone 44 upon sensing 67 motion around the apparatus 10.

In some embodiments, the switch 62 must be manually set before sensing 64 contact and sensing 67 motion around the apparatus 10 will induce broadcasting of the message or detecting sound by means of the microphone 44. In operation, the operator may set the switch just prior to deployment of the apparatus 10 such that the switch 62 will cause broadcasting of the message upon sensing 64 contact and sensing 67 motion around the apparatus 10.

Figure 12A:
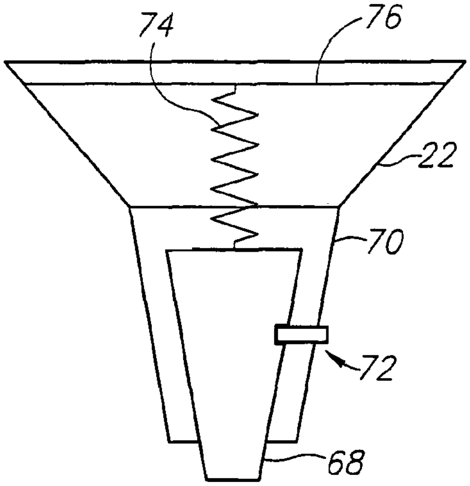
FIGS. 12A and 12B are side views of an expanding air-droppable loudspeaker, in accordance with an embodiment of the present invention.
Figure 12B:
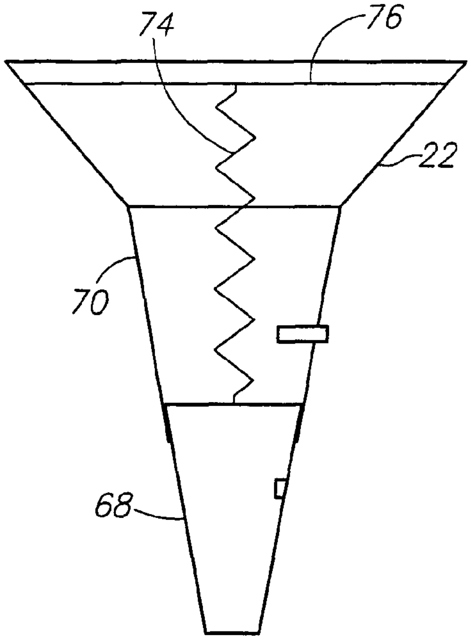

Referring to FIGS. 12A and 12B, in some embodiments, the horn 12 of an apparatus 10 is expandable to facilitate deployment. In typical situations, large numbers of apparatus 10 will be deployed such that the volume occupied by each apparatus 10 must be minimized to facilitate transportation. In other situations, the size of the apparatus 10 may need to be reduced such that the apparatus 10 falls quickly to the ground. An expandable horn 12 enables minimization of the size of the apparatus 10 while still providing the acoustic efficiency of a larger horn 12.

In one embodiment, a horn 12 includes an inner cone 68 and an outer cone 70. The flared portion 22 typically secures to the outer cone 70. A latching mechanism 72 maintains the inner cone 68 and outer cone 70 in the orientation of FIG. 12A. Upon impact the latching mechanism 72 is disengaged, as shown in FIG. 12B. A biasing member 74, such as a spring, urges the outer cone 70 away from the inner cone 68 to expand the horn 12. Referring to FIG. 10, in some embodiments a brace 76 extends across the flared portion 22 to support one end of the biasing member. The brace 76 may be embodied as two members positioned cross-wise having the ends thereof secured to the flared portion 22.

Figure 13:
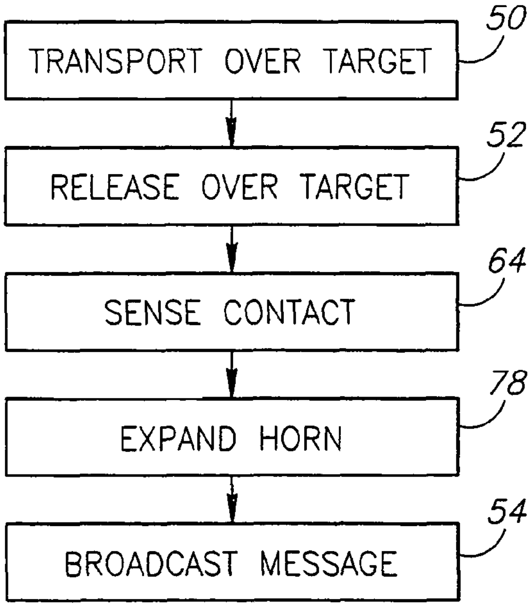
FIG. 13 is a process flow diagram of a method for deploying an expanding air-droppable loudspeaker, in accordance with an embodiment of the present invention.

Referring to FIG. 13, a method 48 for using the apparatus 10 of FIGS. 12A, 12B, and 10 may further include disengaging the latching mechanism 72 and extending 78 the outer cone 70. The method 44 may include expanding 78 the horn 12, such as by disengaging the latching mechanism 72 only upon sensing 64 contact of the apparatus 10 with the ground. In some embodiments, sensing 64 may include breakage of the latching mechanism 72 due to the force of impact in order to permit extension of the outer cone 70. For example, the latching mechanism 72 may be embodied as a post or filament extending between the inner and outer cones 68,70 that is broken by relative movement of the inner and outer cones 68, 70 that occurs upon impact.

Figure 14A:
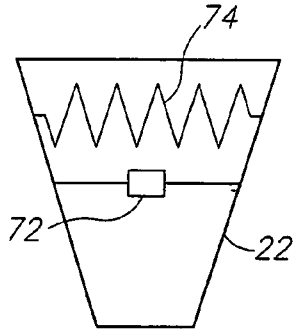
FIGS. 14A and 14B are side views of an alternative embodiment of an expandable loudspeaker, in accordance with an embodiment of the present invention.
Figure 14B:
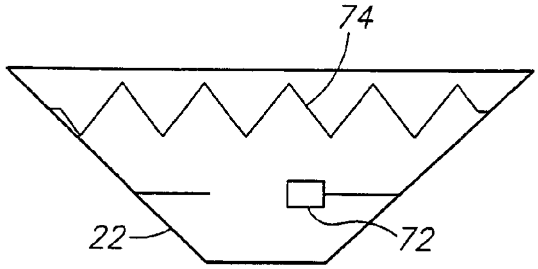

Referring to FIGS. 14A and 14B, in one embodiment, change in the size of the horn 12 is accomplished by expanding the flared portion 22. The biasing member 72 extends across the flared portion 22 such that it urges the flared portion 22 to the expanded position of FIG. 14B. The latching mechanism 72 extends across the flared portion 22 and prevents expansion of the flared portion 22 when engaged. The latching mechanism 72 may include a filament bearing a weight such that the inertial forces on the weight caused by the sudden deceleration of impact causes the filament to break.

Figure 15A:
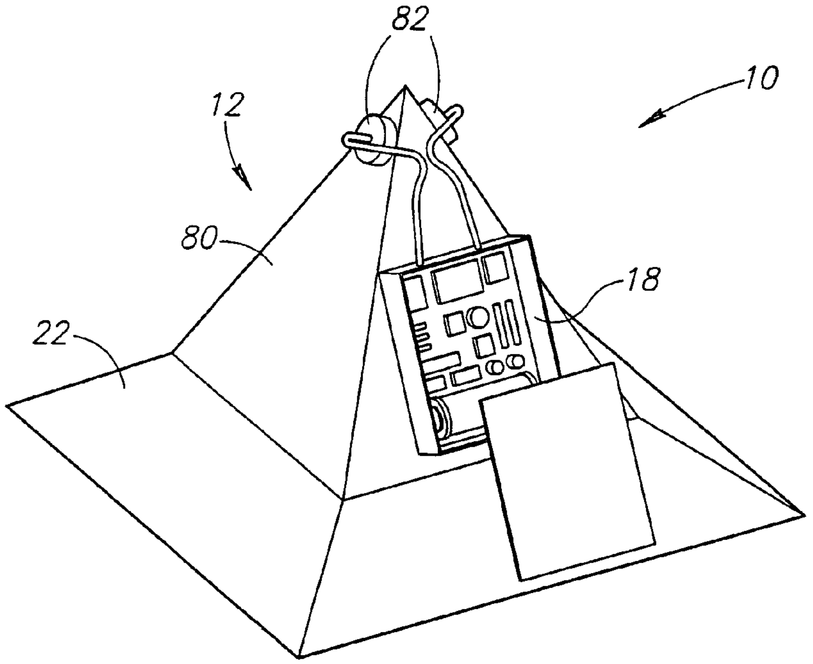
FIGS. 15A through 15F are embodiments of horns suitable for use in an air-droppable loudspeaker, in accordance with an embodiment of the present invention.
Figure 15B:
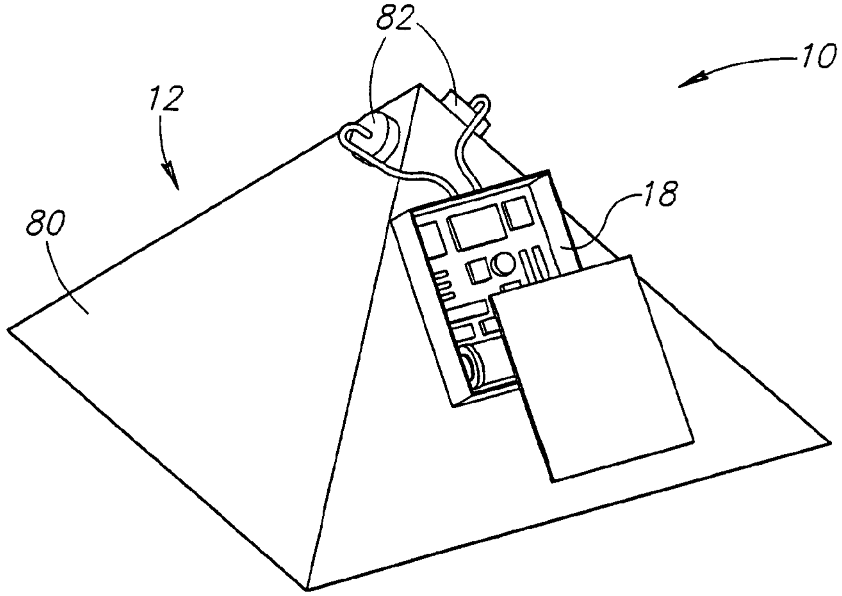
Figure 15C:
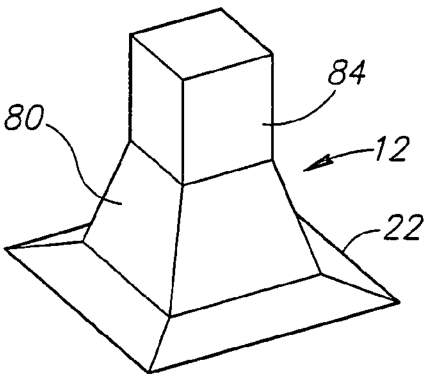
Figure 15D:
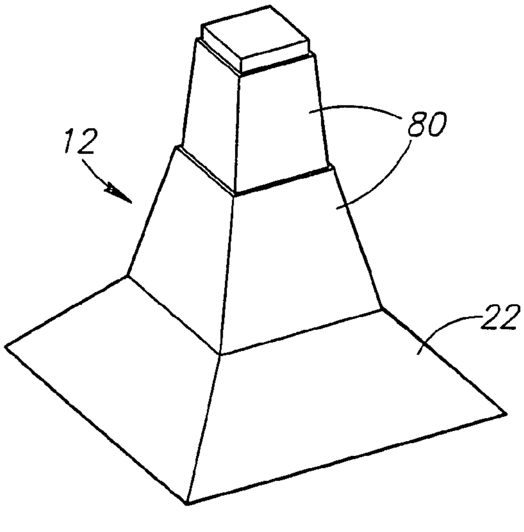
Figure 15E:
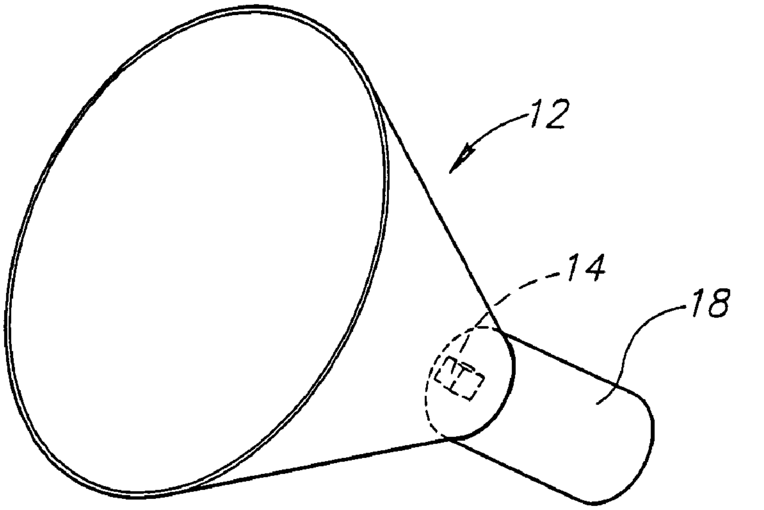
Figure 15F:
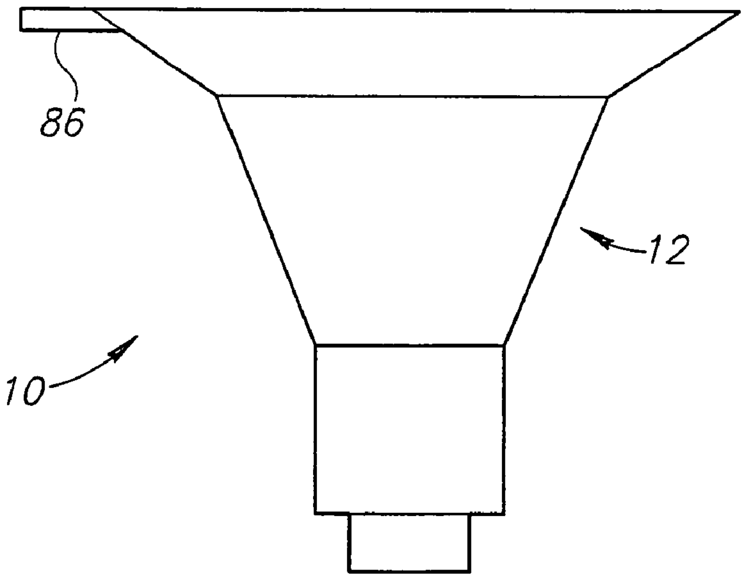

Referring to FIGS. 15A-15E, various embodiments of the horn 12 are possible. Referring to FIG. 15A, in one embodiment, the flared portion 22 is pyramidal and secures to a pyramidal portion 80 having a steeper slope. The speaker 14 may be embodied as transducers 82 secured to the sides of the pyramidal portion 80. The transducers 82 may be embodied as Neodymium Iron Boron Magnets or piezoelectric motors. The flared portion 22 and pyramidal portion 80 may be made of formed plastic, injection molded plastic metal, wood, or other material of sufficient strength. Referring to FIG. 15B, in an alternative embodiment the pyramidal portion 80 is used alone without a flared portion 22. Referring to FIGS. 15C and 15D in another embodiment, a cubic or rectangular portion 84 secures to the pyramidal portion 80 which may have sub-portions having differing slopes, as in the embodiment of FIG. 15D. The cubic portion 84 may receive the speaker 14 and other components of the apparatus 10. Referring to FIG. 15E, in another embodiment the horn 12 is a cone having the speaker 14 and signal generator 18 secured at the mouth thereof. Referring to FIG. 15F, in another embodiment, one or more fins 86 secure to the horn 12. The fin 86 is angled to cause the horn 12 to spin as it falls in order to reduce the speed of the loudspeaker 10 as it falls.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An apparatus for broadcasting information, the apparatus comprising:
- a horn having a flared portion adapted to cause air drag;
- a signal generator;
- a speaker secured to the horn and electrically coupled to the signal generator; and
- a sensor coupled to the signal generator, the sensor configured to switch on the signal generator upon detecting resting of the horn on the ground.

2. the apparatus of claim 1, wherein the sensor is a tipping sensor sensing tipping of the horn.

3. The apparatus of claim 1, further comprising a shock absorbing portion secured to the horn opposite the flared portion.

4. The apparatus of claim 1, further comprising a fin extending outwardly from the horn.

5. The apparatus of claim 1, wherein the sensor is a tipping sensor sensing tipping of the horn.

6. The apparatus of claim 3, wherein the horn flares exponentially with distance from the shock absorbing portion.

7. The apparatus of claim 1, further comprising a proximity sensor sensing movement proximate the apparatus, the proximity sensor coupled to the signal generator, the sensor configured to switch on the signal generator upon detecting movement proximate the apparatus.

8. An apparatus for broadcasting information, the apparatus comprising:
- a horn having a flared portion adapted to cause air drag;
- a signal generator;
- a speaker secured to the horn and electrically coupled to the signal generator;
- a sensor coupled to the signal generator, the sensor configured to detect the horn resting on the ground;
- and a proximity sensor configured to sense movement proximate the apparatus,
- the proximity sensor coupled to the signal generator, the sensor configured to switch on the signal generator upon detecting movement proximate the apparatus when the horn is resting on the ground.

9. The apparatus of claim 8, further comprising a sensor coupled to the signal generator, the sensor configured to switch on the signal generator upon detecting resting of the horn on the ground.

10. The apparatus of claim 8, further comprising a shock absorbing portion secured to the horn opposite the flared portion.

11. The apparatus of claim 10, wherein the horn flares exponentially with distance from the shock absorbing portion.

12. The apparatus of claim 8, further comprising a fin extending outwardly from the horn.

* * * * *